United States Patent [19]

Naiki

[11] Patent Number: 4,947,507
[45] Date of Patent: Aug. 14, 1990

[54] AUTOMOBILE WIPER APPARATUS
[75] Inventor: Hiroshi Naiki, Aichi, Japan
[73] Assignee: Toyota Jidosha Kabushiki Kaisha, Toyota, Japan
[21] Appl. No.: 274,301
[22] Filed: Nov. 21, 1988
[30] Foreign Application Priority Data
 Nov. 24, 1987 [JP] Japan .................. 62-295797
[51] Int. Cl.$^5$ .............................. B60S 1/26
[52] U.S. Cl. .................. 15/250.16; 15/250.17; 15/250.27; 74/70; 74/75
[58] Field of Search .......... 15/250.16, 250.17, 250.19, 15/250.27; 74/70, 75, 600

[56] References Cited
U.S. PATENT DOCUMENTS

| | | |
|---|---|---|
| 2,786,175 | 3/1957 | Rohr . |
| 2,847,978 | 8/1958 | Kelley et al. ............... 15/250.16 X |
| 3,113,333 | 12/1963 | Howard ..................... 15/250.16 |
| 4,466,153 | 8/1984 | Seibicke .................... 15/250.16 |
| 4,475,263 | 10/1984 | Lystad ...................... 15/250.19 |
| 4,559,845 | 12/1985 | Fallows ..................... 15/250.16 |
| 4,597,129 | 7/1986 | Eustache et al. ............. 15/250.16 |
| 4,610,046 | 9/1986 | Buschur et al. .............. 15/250.16 |
| 4,741,067 | 5/1988 | Jambor et al. ............... 15/250.16 |
| 4,787,114 | 11/1988 | Okudaira .................... 15/250.13 |

FOREIGN PATENT DOCUMENTS

| | | |
|---|---|---|
| 1906440 | 8/1970 | Fed. Rep. of Germany . |
| 60-54655 | 4/1985 | Japan . |
| 61-255499 | 10/1986 | Japan . |
| 61-190758 | 11/1986 | Japan . |

Primary Examiner—Frankie L. Stinson
Attorney, Agent, or Firm—Cushman, Darby & Cushman

[57] ABSTRACT

An automobile wiper device has a pair of wiper arms movable between full-concealed position and semi-concealed position. The wiper arm reciprocates between the lower and upper turning positions, by the rotating force transmitted from the driving motor through the driving mechanism. The driving mechanism includes a driving lever secured together with the wiper arm to the rotary shaft fixed on the vehicle body, a switching lever coupled to the crank arm of the driving motor through a link shaft, and a turn-over spring secured between the switching lever and the driving lever. When the wiper resting position is jammed with snow, said switching lever acts to shift the lower turning position of the wiper arm from the full-concealed position to the semi-concealed position upon the rotating force being transmitted from the driving motor exceeds the bias force of the turn-over spring.

1 Claim, 6 Drawing Sheets

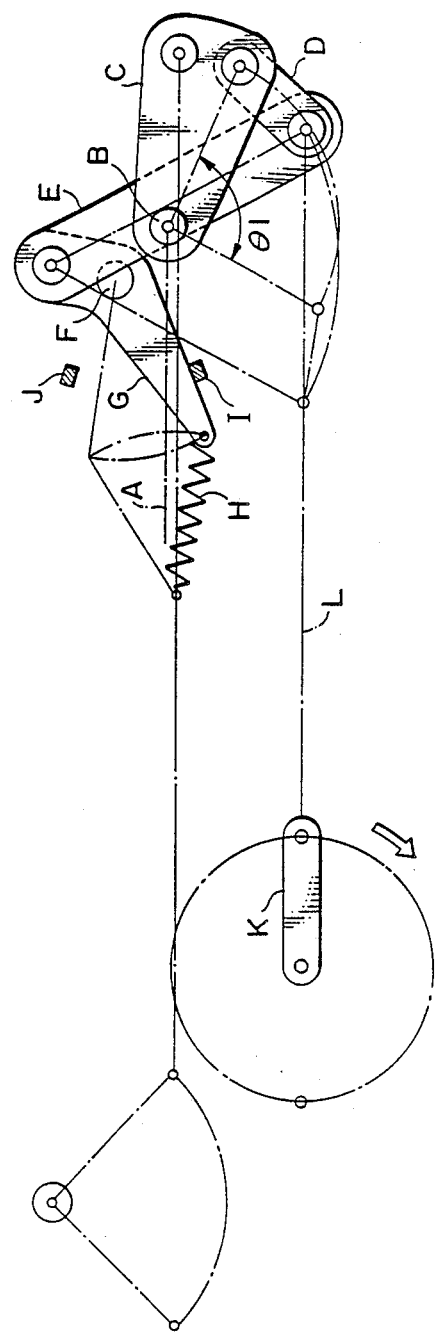

AUTOMOBILE WIPER APPARATUS

BACKGROUND OF THE INVENTION

1. Field of the Invention

This invention relates to an automobile wiper apparatus, more particularly to an improved automobile wiper apparatus which enables the wiper arm to be conducted to both a full-concealed position and a semi-concealed position.

2. Description of the Prior Art

Automobile wiper appratus having wire arms movable with the full concealed position as a basic location is well known. But this type of appratus can easily get blocked when snow is packed in the wiper arm resting portion below the hood, being the lower turning position of the wiper arm.

To overcome such a problem, means for automatically or manually converting the lower turning position of the wiper arm to a position upper than said resting position have been proposed, as disclosed in Japanese Patent Application No. Sho 61-255499.

The general inventive structure of said disclosure is shown in the FIG. 6.

First lever C fixed to the rotating shaft B of the wiper arm A is connected to the second lever E through the intermediate link D. The second lever E is secured to one end of the switching lever G swingably supported on the vehicle body with the axis F.

The switching lever G is movable by the bias force of the turn-over spring H, between the full-concealed position in contact with the stopper I and semi-concealed position in contact with the stopper J. Wiper link L secured to the crank lever K of the driving motor is connected to the connecting point of said second lever E and intermediate link D.

Under such a structure, the wiper arm A moves from the full-concealed position to the semi-concealed position by manual operation or by the resistance of the snow when the resting position is jammed with snow.

However, said conventional apparatus has been disadvantageous in that double lever mechanism consisting of the first lever C, intermediate link D, second lever E, switching lever G and turn-over spring H are indispensable to drive the wiper arm between said two positions. This double lever mechanism requires significantly large housing space, which has frequently inpeded the device to be installed on the vehicle, depending on the vehicle type.

SUMMARY OF THE INVENTION

It is therefore the object of the present invention to provide an automobile wiper device which can be compactly composed and certainly and easily switched between the full-concealed position and the semi-concealed position.

The automobile wiper device of this invention includes a rotary shaft rotatably mounted on the vehicle body. Wiper arm and driving lever are secured to said rotary shaft. Switching lever is rotatably supported on said driving lever by a supporting shaft being installed in parallel to said rotary shaft. The switching lever is connected to the crank arm of the wiper driving motor by the link shaft. Said switching lever is assembled to be movable between the first position where said link shaft is closed to the rotary shaft and the second position where said link shaft is distant therefrom, by the turn- over spring installed between the driving lever and the switching lever itself.

Said first position corresponds to the lower turning position of the wiper arm at full-concealed state, while said second position to the same at semi concealed state.

Further, the fixing position of the supporting shaft of said switching lever is set up on a bisector of the angle formed by connecting the centers of the link shaft at first and second positions with the link connecting point of the crank arm, when the wiper arm is led to the upper turning position by the driving lever.

FIG. 5 shows the operation of the wiper device 1 according to the present invention. The wiper arms 5, 6 and the wiper blades 2, 3 reciprocally move between either one of the lower turning and full-concealed position shown by the solid line or the lower turning and semi concealed position shown by the chained line, and the common upper turning position 9, 10. The full-concealed position is located within the resting position 8 below the hood 7, whereas the semi-concealed position is located upper than the full-concealed position.

When the wiper arms 5, 6 are at the full-concealed position and driving motor(not shown) starts, the switching lever connected to the crank arm through the link shaft comes to be reciprocally moved with the rotary movement of the crank arm. The movement of the switching lever swingably rotates the drive lever supporting said switching lever. The wiper arm secured to the rotary shaft of the drive lever, then, comes to reciprocate between the lower turning position and the upper turning position together with the driving lever, to wipe out the windshield 4.

Under these conditions, snow jamming at the resting position 8 below the hood 7 generates resisting force to impede the wiper arms 5, 6 to move until the complete lower turning position. This snow jamming also transmits turning force from the crank arm to the switching lever through the link shaft. When the strength of said rotating force of the switching lever exceeds the resisting force of the turn-over spring holding the switching lever at the full-concealed position.

Then the switching lever and the driving lever supporting the switching lever with the supporting shaft come to turn from the first position to the second position, by the force transmitted from said crank arm and the resisting force of the turn over spring. At the first position said link shaft is near the rotary shaft, and at the second position said link shaft and rotary shaft are separated. In other words, the second position is on the arc formed by the link connecting point of the crank arm with the link at the lower turning position as a center, and the length of the link as a radius.

This turning movement pulls up the wiper arm from the lower turning position of the full-concealed position to the lower turning position of the semi concealed position.

Thus, the wiper arm fixed to the driving lever moves to the lower turning position of the semi-concealed state and is reciprocated between the lower turning position and the upper turning positions 9, 10. Accordingly, the fear of the wiper arm being locked by the snow jammed at the resting position 8 below the hood 7 can be eliminated.

Said turning movement of the switching lever 14 and the driving lever 12 can be also manually operated. In the shown embodiment, the returning movement of the wiper arm from the semi concealed position to the full-concealed position is mannally operated.

In this invention, the installed position of the supporting shaft 13 axially supporting the switching lever on the driving lever 12 is established on the bisector of the angle connecting the shaft center of the link shaft of the switching lever at the first and second positions and the link connecting point of the crank arm, when the driving arm conducts the wiper arm to the upper turning position.

Therefore, the upper turning position scarcely changes regardless of being located either at the full-concealed position or semi-concealed position.

BRIEF DESCRIPTION OF THE DRAWINGS

FIG. 6 illustrates the operating view a conventional wiper device.

DETAILED DESCRIPTION OF THE PREFFERED EMBODIMENT

Figure 3:
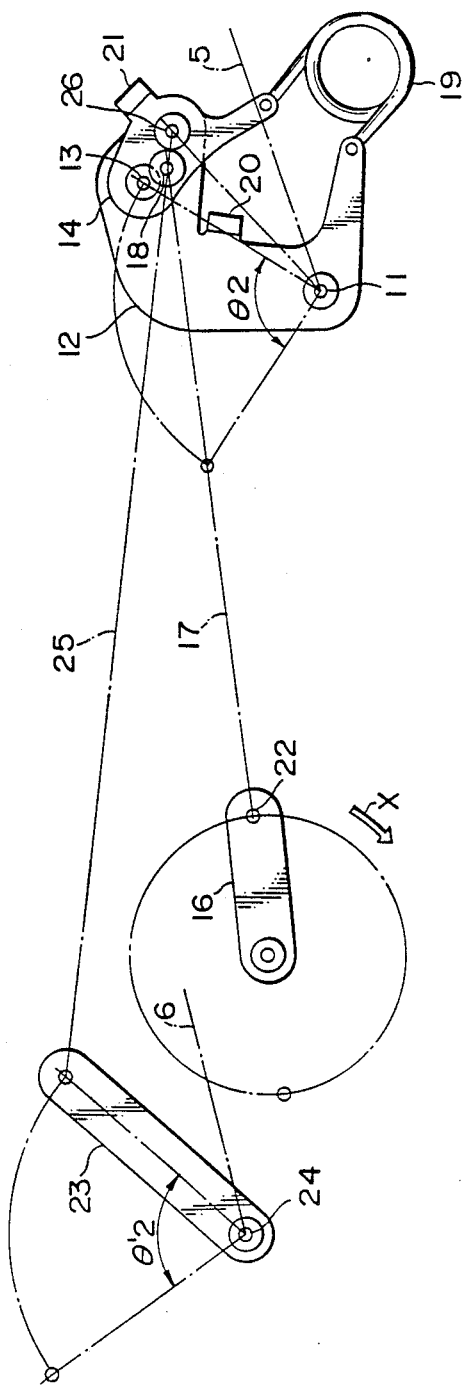
FIG. 3 illustrates the operating view of the automobile wiper device according to the present invention with the wiper arm being located at the semi-concealed and lower turning position.
Figure 4:
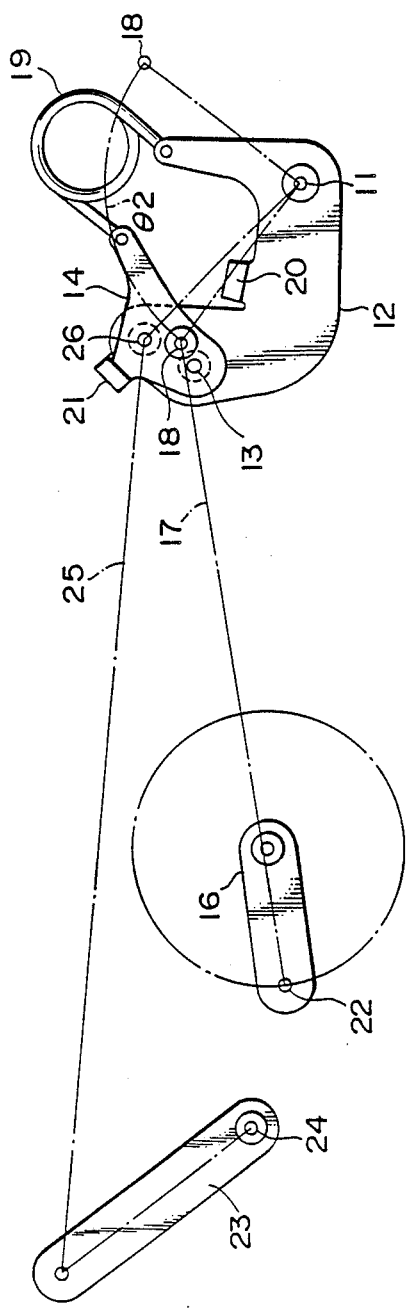
FIG. 4 illustrates the operating view of the automobile wiper device according to the present invention with the wiper arm being located at the semi-concealed and upper turning position.
Figure 5:
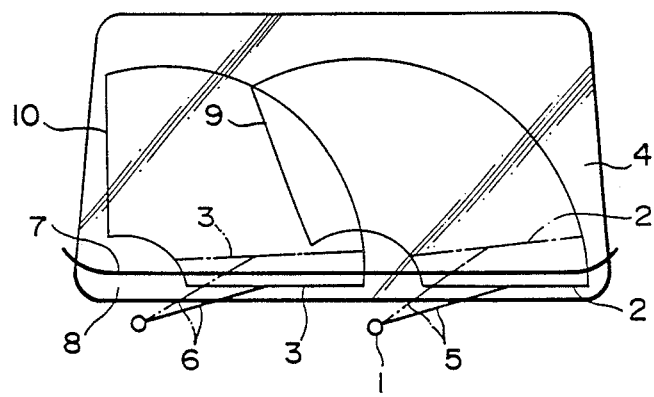
FIG. 5 illustrates a rough front view showing the windshield and operating state of the wiper device according to the present invention.

FIGS. 1 to 5 show an embodiment of this invention which wipes out the windshield 4 having been referred in the FIG. 5.

Figure 1:
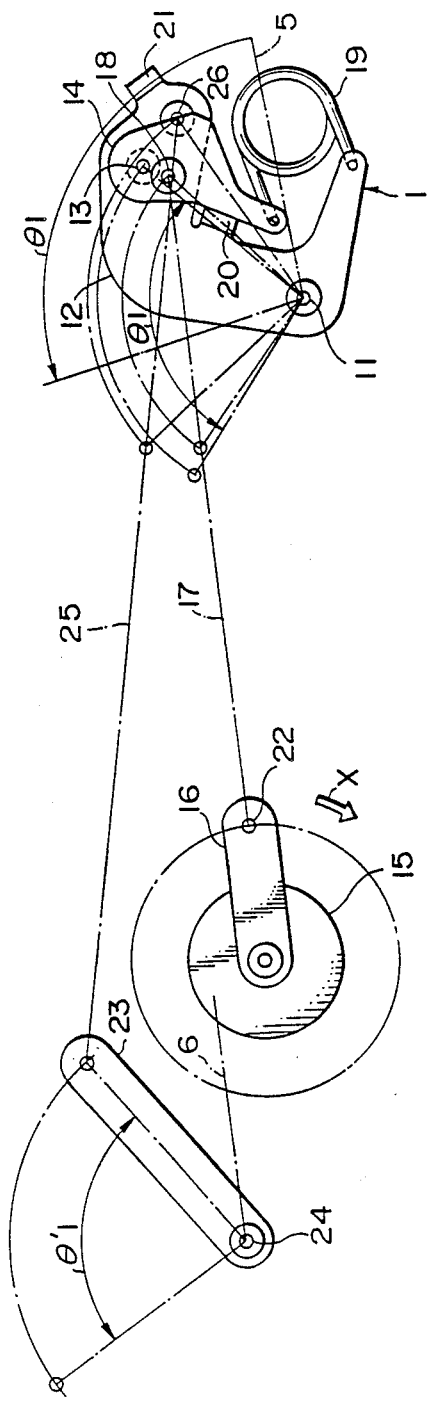
FIG. 1 illustrates the operating view of the automobile wiper device according to the present invention with the wiper arm being located at the full-concealed and lower turning position.
Figure 2:
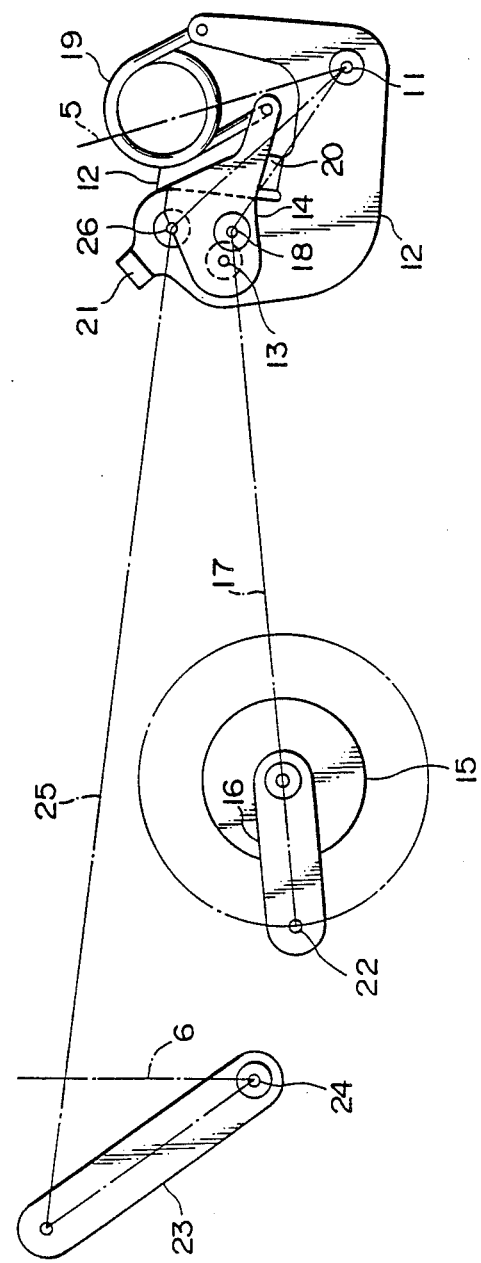
FIG. 2 illustrates the operating view of the automobile wiper device according to the present invention with the wiper arm being located at the full-concealed and upper turning position.

FIG. 1 shows an explanatory drawing where the wiper arms 5, 6 are at the full-concealed and lower turning position. FIG. 2 shows an explanatory drawing where the wiper arms, 5, 6 are moved to the upper turning position form the state of the FIG. 1. FIG. 3 shows an explanatory drawing where the wiper arms 5, 6 are at the semi-concealed and lower turning position. FIG. 4 shows an explanatory drawing where the wiper arms 5, 6 are moved to the upper turning position from the state of the FIG. 3.

Firstly, mechanical structure of the wiper device 1 will be explained. Wiper arm 5 and the driving lever 12 are secured to the rotary shaft 11 being rotatably supported on the vehicle body. Switching lever 14 is also rotatably supported on said driving lever 12 by the supporting shaft 13 in parallel to said rotary shaft 11.

The switching lever 14 is linked to the crank arm 16 of the wiper driving motor 15 through the link 17 and the link shaft 18.

Said switching lever 14 has a turn-over spring 19 disposed between the end portion thereof and the driving lever 12, said end portion being separated from the link shaft 18 in regard to said supporting shaft 13 in almost same radial direction. The switching lever 14 is furnished to be rotatingly movable between the first position where said link shaft 18 is closed to the rotary shaft 11 and the second position far from the rotary shaft 11.

The number 20 designates the stopper provided on the driving lever 12 to make the switching lever 14 be stable at the first position, whereas the number 21 designates the stopper formed on the driving lever 12 to make the switching lever 14 be stable at the second position.

As shown in the FIG. 1, the first position of the link shaft 18 accords with the full-concealed and lower turning position of the wiper arm 5, while the second position accords with the semi-concealed and lower turning position of the wiper arm 5.

The position of the supporting shaft 13 axially supporting the switching lever 14 on the driving lever 12 is situated on the bisector of the angle formed by the line represented by the link 17 in the FIG. 2 and in the FIG. 4.

The number 23 designates the second driving lever for reciprocating the wiper arm 6. The driving lever 23 is fixed to the rotary shaft 24 together with the wiper arm 6 rotatably secured to the vehicle body, and connected to the driving lever 12 through the link shaft 26 so as to synchronously drive the wiper arm 6 when the wiper arm 5 is drived by the wiper motor 15.

The FIG. 1 shows the state where the link shaft 18 is at the first position and the switching lever 14 is in contact with the stopper 20 by the bias force of the turn-over spring 19, and the wiper arm 5 is at the lower turning position. In this condition, the lower turning position of the wiper arm 5 accords to the resting position 8 below the hood 7 shown in the FIG. 5.

When the wiper driving motor 15 is operated and the crank arm 16 rotates in the arrow X direction from the state of the FIG. 1, the rotating force will be transmitted sequentially to the link shaft 18, switching lever 14 and the driving lever 12 through the link 17, to reciprocate the wiper arm 5.

The rotation by 180 of the crank arm leads the driving lever 12 and the wiper arm 5 to move by the angle, until the upper turning position as shown in the FIG. 2.

Next 180 rotation of the crank arm 16 returns the driving lever 12 and the wiper arm 5 by an angle, again and comes to the state shown in the FIG. 1. This operation and the reciprocating movement of the wiper arm 6 by the angle, will be repeated.

When the wiper arm 5 returns to the lower turning position (FIG. 1) from the upper turning position (FIG. 5) snow jammed at the resting position 8 of the FIG. 5 will impede the wiper arm 5 to reach until the lower turning position, being equal to the resting position. At this time, the rotary shaft 11, driving lever 12 and the switching lever 14 will have resistance against the rotating force transmitted through the link 17. But the link shaft 18 of the switching lever 14 will be continued receiving rotating force from the wiper driving motor 15 through the link 17.

In consequence, when the strength of the rotating force transmitted through the link 17 exceeds the bias force of the turn over spring 19 holding the switching lever 14 at the first position, the switching lever 14 comes to rotate with the supporting shaft 13 as a rotating center. The switching lever 14, then, will be turned at a stretch to the second position of the link shaft 18 in contact with the stopeer 21 under the turn-over effect of the turn-over spring 19. Thus, the wiper arm 5 is shifted at the lower turning position without any more rotation of the driving lever 12, the rotary shaft 11 and the link 17. At the same time, crank arm 16 starts turning process directing to the upper turning position.

Of course, the turning movement of said link shaft 18 of the switching lever 14 for the second position can be manually carried out.

FIG. 3 shows the state where the link shaft 18 is at the second position whereas the wiper arm 5 is at the semi-concealed position. The crank arm 16 is starting the turning movement by 180 in the arrow X direction.

From such a condition shown in the FIG. 3, turning movement by 180 of the crank arm 16 leads the accessary members of the wiper arm 5 and the driving lever 12 to rotate by the angle. And the wiper arm 5 will be conducted to the upper turning position as shown in the FIG. 4, and the wiper arm 6 will rotate in the same manner by the angle.

As shown in the embodiment, such a structure where the second driving lever 23 is synchronously driven with the driving lever 12 through the link 25, the switching function will be performed even when the snow jamming occurs only on the side of the wiper arm 6.

Although in the shown embodiment the returning operation of the link shaft 18 to the first position is carried out by manual operation on the switching lever 14, it can be also performed by automatic returning device.

According to the present invention, the bias force of the turn over spring 19 is set to be a little lower than the turning force of the wiper driving motor 15. In consequence, the wiper arm 5 set at full concealed position continues to reciprocate with the semi-concealed position as lower turning position even when the resting position 8 of the wiper device below the hood 7 is jammed by snowing.

As explained above, since the position of the supporting shaft 13 is established on the bisector of the angle formed by the lines represented by the link 17 in the FIG. 2 and the FIG. 4, the upper turning position of the wiper arm 5 is maintained at the same point which would cause no difference in the wiping out operation of the wiper blades 2, 3 on the windshield 4, even if the wiper arm 5 reciprocates with either the full-concealed or semi-concealed position as the lower turning position.

In the present invention, the wiper arm can be moved from the full-concealed position to the semi-concealed position upon having snow jamming in the resting position, only by providing the switching lever, driving lever and the turn-over spring beside the link connected to the crank arm of the wiper driving motor. This has enabled the wiper device to be composed in simple design and small size without requiring restriction on installing space.

Further, the switching operation of the wiper arm from the full-concealed position to the semi-concealed position can be automatically and certainly perfomed.

What is claimed is:

1. An automobile wiper device comprising;
   a wiper and a wiper driving lever secured to a rotary shaft rotatably supported on a vehicle body;
   a switching lever rotatably supported by a supporting shaft provided in parallel to the rotary shaft of said driving lever, and connected to said wiper and crank arm through a link shaft at a link connecting point; and
   a turn-over spring installed between said switching lever and driving lever, and rotatingly shifts said link shaft between the first position in vicinity to said rotary shaft and the second position distant therefrom;
   wherein said first and second positions are set up to lie at a lower turning position when the wiper arm is at the full-concealed and semi-concealed positions respectively, and
   a installing position of the supporting shaft for supporting said switching lever on the driving lever is set up to lie on a bisector of the angle formed by the center of the link shaft of the switching lever and the link connecting point of the crank arm at the first and second positions when the wiper arm is conducted to an upper turning position by said driving lever.

* * * * *